Nov. 23, 1971 R. DUBITSKY 3,621,579
TAPE WITH INDICIA TRANSFER
Filed Nov. 20, 1967 2 Sheets-Sheet 1

INVENTOR

ROSE DUBITSKY

United States Patent Office 3,621,579
Patented Nov. 23, 1971

3,621,579
TAPE WITH INDICIA TRANSFER
Rose Dubitsky, 1734 N. Troy St., Arlington, Va. 22201
Filed Nov. 20, 1967, Ser. No. 684,324
Int. Cl. B43i 7/00; G01b 3/10
U.S. Cl. 33—137                                            3 Claims

ABSTRACT OF THE DISCLOSURE

This invention relates to a measuring instrument such as a tape which is provided with legible calibrated markings and an adhesive for affixing the instrument to a surface to be marked, a transfer medium being so disposed between the instrument and the surface to be marked that upon application of pressure to certain areas of the instrument, the transfer medium is deposited on the surface to be marked, over an area coincident with the area below which the pressure is applied to the instrument.

Ordinary measuring tape usually consists of a surface such as fabric, paper, metal, or the like with linear measure graduations on one or more surfaces thereof. When such a measure is to be used to determine the place at which measure markings should be made on the surface to be measured, the tape is applied to the surface and held in place thereon by hand or by means of pins, tacks, etc. Following the application of the tape to a surface as aforesaid, the user thereof then usually proceeds to apply a marking to the surface at the desired points of measurements and this is usually accomplished by marking the surface as with a pencil, chalk, etc. at a point in alignment with the points of measurement. This manner of placing a reference mark on a surface can lead to inaccuracies inasmuch as the reference mark must always be in perfect alignment with the measure graduations on the ruler or tape, and if a person, through inadvertence or through other reason, does not place the reference mark in perfect alignment with the measure graduation on the tape or ruler, the reference mark is inaccurately placed on the surface being measured, resulting in an imperfect measurement. As can be appreciated, inaccurate markings may be most objectionable, particularly where measure increments of, say, ⅛ inch are to be applied to a surface.

Securing the tape or ruler to a surface with pins, tacks, and the like can present problems, particularly when, after the tape has been secured in this manner to a surface and some markings have already been applied to the surface to correspond to measure graduations on the tape or ruler, for some reasons the tape or ruler becomes detached from the surface, it then becomes necessary to accurately realign the tape or ruler with the previously formed markings to permit the continuation of applying markings to the surface. Obviously, if the markings are not accurately aligned with the measure graduations on the tape or ruler, this will result in an imperfectly marked surface. Moreover, the use of pins, tacks, and the like may damage or mar the surface to which the tape is applied.

With the above in mind, I will now proceed to describe my preferred embodiments of the invention:

PREFERRED EMBODIMENTS OF THE INVENTION

Figure 1:
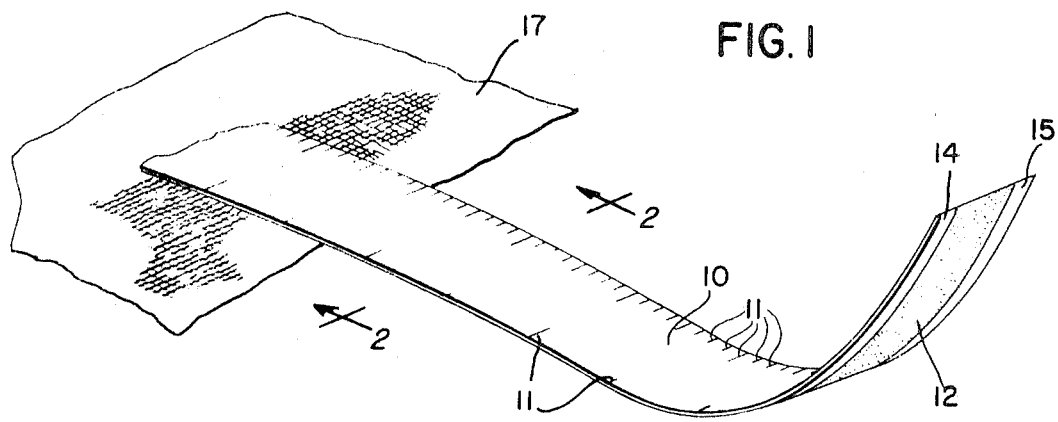
FIG. 1 is an enlarged fragmentary perspective view of the tape of the present invention.

Referring to the drawings, there is shown at numeral 10 in FIG. 1 a tape or ruler which may be made of any suitable material such as fabric, plastic, metal, etc. It is preferable that the tape be flexible so that it can conform to an irregular surface as well as to a flat surface. As can be seen, scale markings 11 of various measure graduations are applied in any manner to the upper surface of the tape and the measure graduations may be varied so as to accommodate the tape or ruler to any particular need, such as if the tape is to be used only to apply markings every inch, then the tape is so graduated, whereas if the tape is to be used to apply markings at only every one-half inch, then the tape is provided only with half inch markings, and so on.

As can be seen in the drawings, a tacky adhesive 12 is applied to the undersurface of the tape 10 and while I have shown the adhesive as extending substantially across the length and width of the tape, it is contemplated that only spot adhesive be applied to the undersurface of the tape and still permit the tape to perform the same function. For economical reasons, it may be more feasible to employ spot adhesive rather than to coat the entire area as shown in the drawings. As shown more clearly in FIG. 2 of the drawings, the adhesive 12 is preferably disposed within a depression 13 formed in any manner on the undersurface of the tape 10. The placement of the adhesive 12 within the depression 13 permits for the entire undersurface of the tape to be coextensive with the surface to which it is applied for the purpose to be more fully described hereinafter.

Of course, if only spot adhesive is to be employed, then depressions may be formed on the undersurface of the tape at only such places as will receive such spots of adhesive.

Extending throughout the length of the tape or ribbon at the edges thereof are carbonized areas 14 and 15. The carbonized area may be coated with any substance which will cause a transfer of the substance to the surface to which the tape is applied when pressure is applied in the vicinity of the carbonized area. Any means may be employed to apply pressure, such as a pencil or blunt instrument if the carbonaceous areas are of substantial dimensions. However, if the carbonaceous area coincides with any one or more of the measure graduations appearing on the upper surface of the tape or ruler, application of rolling or other direct pressure will effect transfer of the substance to the surface to be marked. While I have described the surfaces 14 and 15 as being carbonized, these areas may, for instance, be coated with a solution containing micro-encapsulated inks which will cause an impression to be transferred to the surface to which the tape is applied when pressure on any measure graduation is imposed thereon in the manner set forth above.

Figure 3:
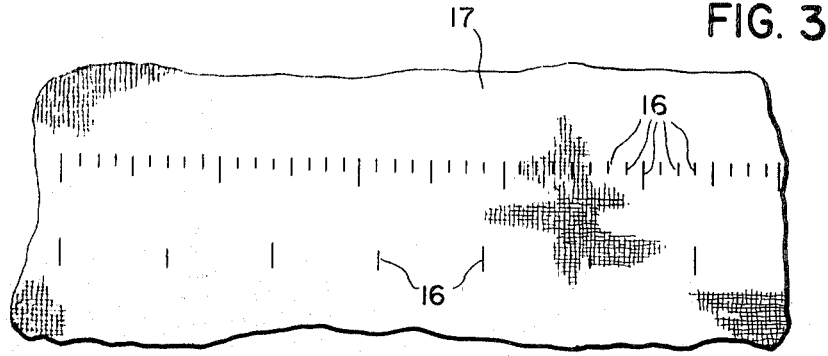
FIG. 3 is an enlarged fragmentary view of a surface with reference marks applied thereto.

FIG. 3 of the drawings illustrates a fabric in this instance which has received a number of measure graduations thereon indicated generally at 16. The fabric 17 is representative only of the type of surface to which the tape of my invention may be applied. Obviously, the surface can be paper, wood, metal, etc., suffice it to say that the tape can be applied to any surface which is capable of retaining the markings made by the carbonized surface of the tape when pressure is applied to any one of the measure graduations in the manner set forth above.

Figure 4:
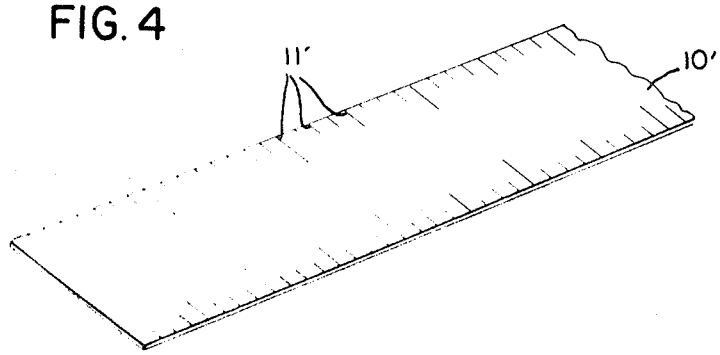
FIG. 4 is an enlarged fragmentary perspective view of the upper surface of a ruler (either flexible or rigid) embodying the principles of the present invention.
Figure 5:
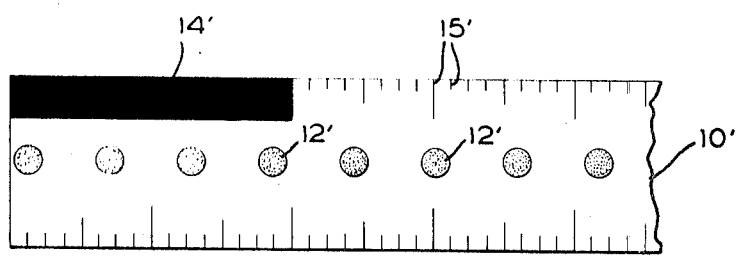
FIG. 5 is an enlarged fragmentary perspective view of the undersurface of the ruler shown in FIG. 4.
Figure 6:
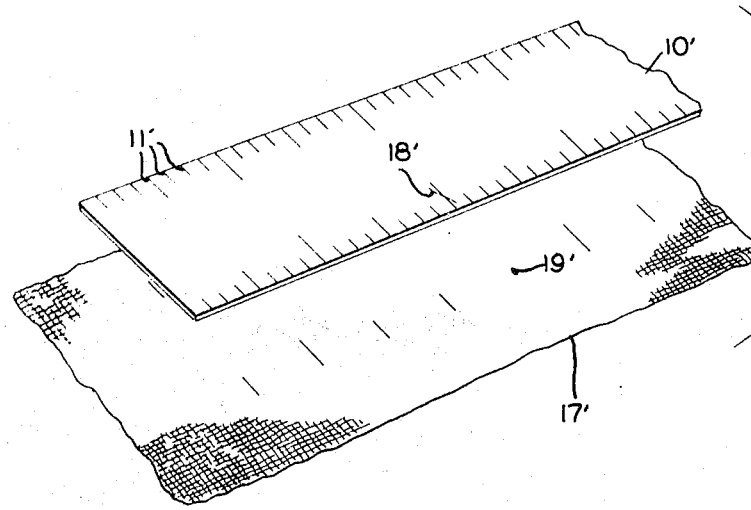
FIG. 6 is an enlarged fragmentary view of a surface with reference marks applied thereto with the ruler shown in FIG. 4.

Referring to FIGS. 4, 5 and 6 of the drawings, there is shown at 10′ a ruler which may be made of either a rigid or flexible material such as metal, plastic, and the like. The ruler is provided on the upper surface thereof with scale markings 11′ of various measure graduations which are applied thereto in any known manner.

As can be shown more clearly in FIG. 5 of the drawings, a number of adhesive areas can be provided on the undersurface of the ruler such as shown with adhesive spots at 12′. As can be appreciated as many adhesive spots may be applied to the undersurface of the ruler as will insure the ruler to be firmly yet releasably positioned onto a surface on which reference marks are to be applied in the manner to be described more fully hereinafter.

Figure 2:
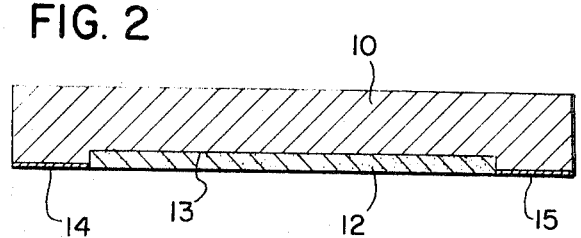
FIG. 2 is a section taken on lines 2—2 of FIG. 1, looking in the direction of the arrows.

The adhesive spots 12′ may be mounted in any manner in depressions formed in any known manner on the undersurface of the ruler. Thus, instead of having a continuous adhesive area such as shown in FIGS. 1 and 2 of the drawings, only spot adhesive areas may be provided for securing the ruler to a surface which is to be marked off.

Shown in FIG. 5 of the drawings is a continuous strip of a pigmented coating in the nature of a transferable medium such as carbonaceous material 14′ which can extend throughout the entire area of the length of the ruler at one or both edges of the ruler or, if desired, the carbonaceous material can be applied only at the undersurface of the ruler which is in alignment with the scale graduations 11′ which appear on the upper surface of the ruler such as shown at 15′.

A distinct advantage is presented when the carbonaceous or other transferable medium is applied only at the undersurface of the scale graduations which appear at the upper surface of the ruler. For instance, if one using the ruler shown in FIGS. 5 and 6 does not accurately follow the line of scale graduations appearing on the upper surface of the ruler, then the only marking which will appear on the surface to be marked will be at the spot or area traversed with the marking instrument. This is clearly shown in FIG. 6 of the drawings which shows a surface 17′ of a fabric and the like which is to be marked off with certain scale graduations. Shown at 18′ is a marking which has been applied on the upper surface of the ruler and it will be noted that the marking does not follow the line of the scale graduations. In such case, the only marking which will be transferred to the surface 17′ will be at the point where the line 18′ intersects the scale graduation, thus transferring a line of marking on the surface 17′ which will be an exact scale marking which is sought to have transferred. This is clearly shown by the marking 19′ which has been placed on the surface 17′.

Thus, it will be seen that I have provided a tape, ruler, or similar measuring device which can be produced very economically and which can be affixed to any surface and is capable of transferring a marking onto the surface to which it is applied. The employment of a tacky adhesive for securing the tape to a surface enables one to re-use the tape over and over again and actually the tape can be employed as long as the carbonaceous material or other mark transfer media used on the undersurface thereof is capable of transferring a mark to the surface to which the tape is applied when employed in the manner aforesaid.

It will be obvious that I prefer to make my tape or ruler of cloth, plastic, canvas, flexible metal, or other flexible material, but it will be understood that the invention may be embodied in rigid lineal measures or rulers of all kinds.

The invention has been shown in association with a depressed area which is adapted to contain an adhesive therein. However, the purview of the present invention is such that a tape which is to be applied to a surface and secured thereto by means of tacks and the like is not excluded. In such a tape, the edges thereof will be provided with the transfer areas for the purpose set forth above.

The mark transfer medium mentioned above, whether it be carbonaceous or microencapsulated inks should be one that can be removed from the surface to which it has been applied in the aforesaid manner as by simply erasing the same or by washing or by use of a detergent, etc.

It should be pointed out at this time that the mark transfer medium employed on the undersurface of the tape or ruler should be one which contrasts in color with the color of the surface to be marked so that the marking will be clearly visible to the user of the tape or ruler.

I claim:

1. A flexible measuring instrument adapted to be applied to a surface to be measured comprising a calibrated flexible linear measuring member having graduations formed on one surface of said instrument, a mark transfer medium disposed on a surface of said member opposite said one surface and only in areas directly opposite said graduations so that the application of pressure to the vicinity of a selected graduation will cause that selected part of the area of said mark transfer medium to which pressure is applied to be impressed upon the surface to be marked in a pattern corresponding to the pressure applied and in a location directly opposite the pattern and location of the graduations near which the pressure is applied and a pressure-sensitive adhesive disposed between said measuring member and the surface to be measured for detachably securing said member to said surface by the application of pressure.

2. An instrument as set forth in claim 1 in which the mark transfer medium is microencapsulated ink.

3. An instrument as set forth in claim 1 in which the mark transfer medium is a carbonaceous material.

References Cited

UNITED STATES PATENTS

| | | | |
|---|---|---|---|
| 3,136,067 | 6/1964 | Horner | 33—137 |
| 1,747,323 | 2/1930 | Sadler | 33—12 |
| 2,507,684 | 4/1950 | Smith | 33—137 |
| 3,095,649 | 7/1963 | Wightwick | 33—12 |

LEONARD FORMAN, Primary Examiner

S. L. STEPHAN, Assistant Examiner

U.S. Cl. X.R.

33—1 B, 11, 107